United States Patent
Ochotta

(10) Patent No.: US 7,058,785 B1
(45) Date of Patent: Jun. 6, 2006

(54) ADDRESSING OBJECTS IN A LARGE PERSISTENT STORAGE ADDRESS SPACE

(75) Inventor: Emil S. Ochotta, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 434 days.

(21) Appl. No.: 10/444,911

(22) Filed: May 23, 2003

(51) Int. Cl.
*G06F 12/02* (2006.01)

(52) U.S. Cl. ...................... 711/202; 711/170
(58) Field of Classification Search ........ 711/202–208, 711/170–173
See application file for complete search history.

(56) References Cited

U.S. PATENT DOCUMENTS

| 6,760,815 B1 * | 7/2004 | Traversat et al. ........... 711/135 |
| 2003/0088752 A1 * | 5/2003 | Harman ...................... 711/202 |

OTHER PUBLICATIONS

Vivek Singhal et al.; "Texas: An Efficient, Portable Persistent Store"; Fifth International Workshop on Persistent Object Systems; San Miniato, Italy; Sep. 1992; pp. 1-19.

Seth J. White et al.; "QuickStore: A High Performance Mapped Object Store"; VLDB Journal, 4 629-673 (1995); Copyright VLDB; Received Sep. 8, 1994; pp. 629-673.
Sheetal V. Kakkad et al.; "Address Translation Strategies in the Texas Persistent Store"; 5th UNSENIX Conference on Object-Oriented Technologies and Systems (COOTS '99); 199 by the UNSENIX Association; 16 pgs.

* cited by examiner

*Primary Examiner*—Matthew D. Anderson
*Assistant Examiner*—Hetul Patel
(74) *Attorney, Agent, or Firm*—LeRoy D. Maunu

(57) ABSTRACT

Method and apparatus for managing persistent data objects between persistent storage and memory. A plurality of the objects include one or more pointer values that reference other ones of the objects. Persistent storage pointer values in an object are swizzled to memory pointer values when the object is transferred from persistent storage to memory. The memory pointer values in an object to persistent storage pointer values are unswizzled when the object is transferred from memory to persistent storage. In generating a persistent storage address from a persistent storage pointer value, the persistent storage pointer value is multiplied by a selected multiplier.

24 Claims, 6 Drawing Sheets

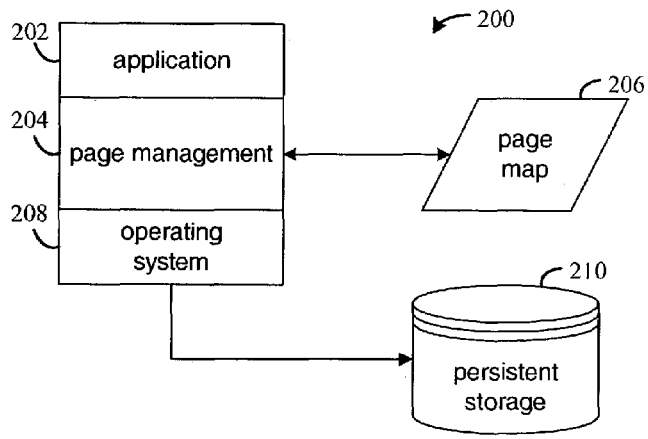

FIG. 4

| HANDLE FAULT | | |
|---|---|---|
| 302 | Extract the address from OS fault info (the pointer that was dereferenced) | |
| 304 | Compute the memory pointer to the page by masking the least significant bits | |
| 306 | Get the page record | |
| 308 | If the page is *no-access* (must be one of *no-access*, *read-only*, or *read-write*) | |
| 310 | | Get the file name and persistent pointer to the page from the page record |
| 312 | | Determine the address of the first page of the convoy |
| 314 | | Mark the page as *read-write* |
| 316 | | Load and swizzle the page (Load Page) |
| 318 | | Mark the page as *read-only* |
| 320 | Else if the page is *read-only* | |
| 322 | | Mark the page as *dirty* so that it is written to persistent storage at the appropriate time |
| 324 | | Mark the page as *read-write* |
| 326 | Else if the page is *read-write* | |
| 328 | | Handle the error |

FIG. 5

| LOAD PAGE | |
|---|---|
| 402 | Get the protection for the first page of the convoy |
| 404 | If the first page of the convoy record is *no-access* |
| 406 | Change the page to *read-write*, and load the first page of the convoy from persistent storage to memory |
| 408 | If the page is not the first page in the convoy |
| 410 | Load the page where the fault occurred |
| 412 | Swizzle the pointer(s) within the object(s) on the page |

FIG. 6

| SWIZZLE PAGE | | | |
|---|---|---|---|
| 502 | Get the type identifier | | |
| 504 | Get the type descriptor for the type identifier | | |
| 506 | For each object on the page (walk through the type descriptor and swizzle persistent pointers) | | |
| 508 | | For each persistent pointer in the object | |
| 510 | | Look up the corresponding page record | |
| 512 | | If there is no page record | |
| 514 | | | Determine the first page of the convoy referenced by the pointer |
| 516 | | | Reserve and protect memory for the convoy |
| 518 | | | Create a new page record that associates the newly reserved page with this persistent pointer value |
| 520 | | Swizzle the pointer using the memory page in the page record and the persistent pointer to compute the memory pointer value, and replace the persistent pointer value with the memory pointer value | |

FIG. 7

| ALLOCATOR | | |
|---|---|---|
| 602 | Obtain a write lock a selected partition of the file | |
| 604 | Get the type descriptor that describes the type identifier | |
| 606 | Allocate sufficient memory for an object of the designated type | |
| 608 | Initialize the object | |

FIG. 8

| UNSWIZZLE PAGE | | |
|---|---|---|
| 702 | Get the type identifier | |
| 704 | Get the type descriptor for the type identifier | |
| 706 | For every object on the page (walk through the type descriptor and unswizzle memory pointer values) | |
| 708 | For each memory pointer value in the type | |
| 710 | | Determine the memory page pointer from the memory pointer value |
| 712 | | Get the page record for the memory page offset, and get the persistent storage page offset from the page record. |
| 714 | | Compute the persistent pointer value |
| 716 | | Replace the memory pointer value with the computed persistent pointer value |

FIG. 9 ized to persistent storage pointer-values when the
object is transferred from memory to persistent storage. To
transfer an object between memory and persistent storage, a
persistent storage address is needed to generate a physical
ADDRESSING OBJECTS IN A LARGE PERSISTENT STORAGE ADDRESS SPACE

FIELD OF THE INVENTION

The present invention generally relates to addressing objects in a large persistent storage address space.

BACKGROUND

Persistent storage devices such as disk storage provide storage for data that is to be preserved beyond the execution lifetime of the program(s) that access the data. Persistent storage is also used in providing a large virtual address space to the programs hosted by a computer. Virtual addressing may provide a program with program address space that is greater than the memory space available in a computer system. The operating system or an application-specific memory manager transfers pages of data between persistent storage and memory, e.g., volatile memory such as RAM, based on accesses made to persistent storage and memory availability.

In some applications a programmer's view of data is of persistent objects being interconnected by pointers. The collection of objects may be scanned or traversed by following the pointers between objects. The pointers within an in-memory object to other in-memory objects generally contain memory addresses. When the object is in persistent storage, the pointers generally contain persistent storage addresses. The addresses are translated when pages are transferred between persistent storage and memory. Swizzling refers to changing a pointer value within an object between a memory address and a persistent storage address when an object is read from persistent storage into memory. Unswizzling is the reverse of the swizzling process.

For most applications the amount of addressable virtual memory has some upper bound. For example, an application designed for a 32-bit computer and using 4 bytes for addressing may have a 4 GB addressing limit. However, as needs change and the application evolves, the data set accessed by the application may grow beyond 4 GB. Thus, the application may need to be modified and/or re-hosted to accommodate this growth.

From a user's perspective, a change to the application may be acceptable as long is it can be accomplished without loss of functionality or performance. From a developer's perspective, it may be desirable to find an approach that minimizes the amount of new code required and code that must be changed. Both the user and developer may prefer to restrict new hardware requirements.

A system and method that address the aforementioned problems, as well as other related problems, are therefore desirable.

SUMMARY OF THE INVENTION

Various embodiments are described for managing persistent data objects between persistent storage and memory. A plurality of the objects include one or more pointer values that reference other ones of the objects. Persistent storage pointer values in an object are swizzled to memory pointer values when the object is transferred from persistent storage to memory. The memory pointer values in an object are unswizzled to persistent storage pointer-values when the object is transferred from memory to persistent storage. To transfer an object between memory and persistent storage, a persistent storage address is needed to generate a physical address for the object on a specific storage device. In generating a persistent storage address from a persistent storage pointer value, the persistent storage pointer value is multiplied by a selected multiplier "n", where "n" is an integer.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which:

FIG. 4 illustrates an example arrangement in which the present invention may be used;

FIG. 5 illustrates a process for handling a page fault in accordance with example embodiments of the invention FIG. 6 illustrates a process for loading the contents of a page from persistent storage to memory FIG. 7 illustrates a process for swizzling each pointer on a page loaded from persistent storage into memory;

FIG. 8 illustrates an example process for allocating memory for a new object; and FIG. 9 illustrates an example process for unswizzling the pointers in each object on a page.

DETAILED DESCRIPTION

In the various embodiments of the invention, the amount of persistent storage that may be addressed by pointers within persistent objects may be increased without increasing the number of bytes used for the pointers. In one embodiment, the pointer value within a persistent object is multiplied by a selected value. The product is then used in addressing the object referenced by the pointer. The selected multiplier effectively increases the size of the address space that may be addressed by a pointer value without requiring additional bytes for storing larger pointer values.

The same number of bytes may be used to store a pointer value in persistent storage and in memory. This supports consistency in the format between an in-memory object and its persistently stored counterpart. In addition, additional persistent storage space may be addressed without having to increase the size of an object to accommodate larger addresses.

In one embodiment, a paging scheme is used in managing the objects between persistent storage and memory. Whether the size of the objects allows storage of multiple objects/page or multiple pages are required for each object is application dependent. However, the example embodiments described herein are applicable to either situation.

The example embodiments are further described in terms of the product of a pointer value and the chosen multiplier. The product is a persistent address, which represents an offset from some base persistent storage address. For example, the base address may be that of a file of objects in persistent storage. It will be appreciated that further address translation may be performed in converting the persistent address to a physical address on a specific storage device.

Figure 1:
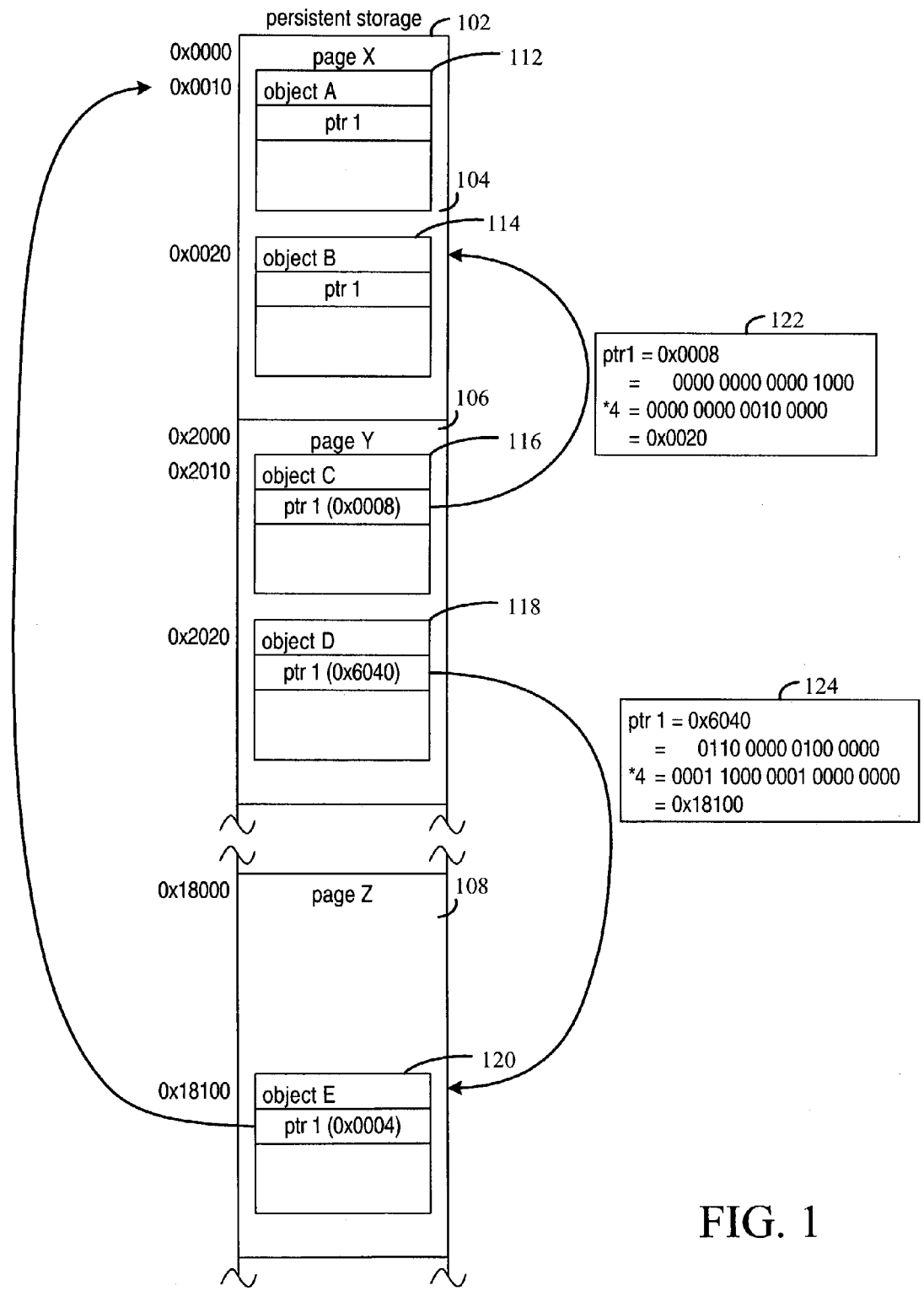
FIG. 1 illustrates an example portion of persistent storage address space.
Figures 2A, 2B:
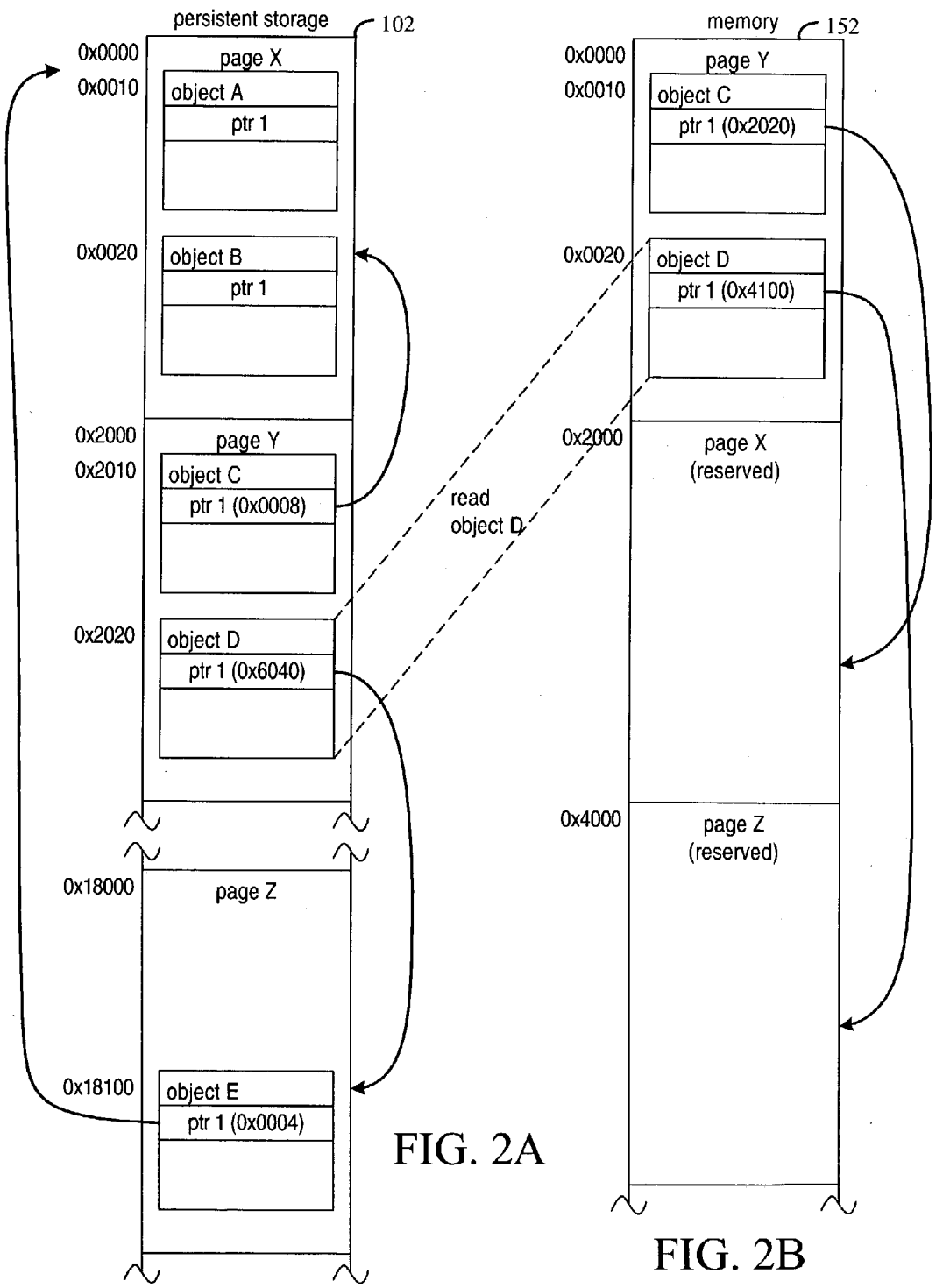
FIG. 2A illustrates an example portion of persistent storage.
FIG. 2B illustrates an example portion of memory in which some of the objects from persistent storage have been paged-in to the memory.
Figure 3:
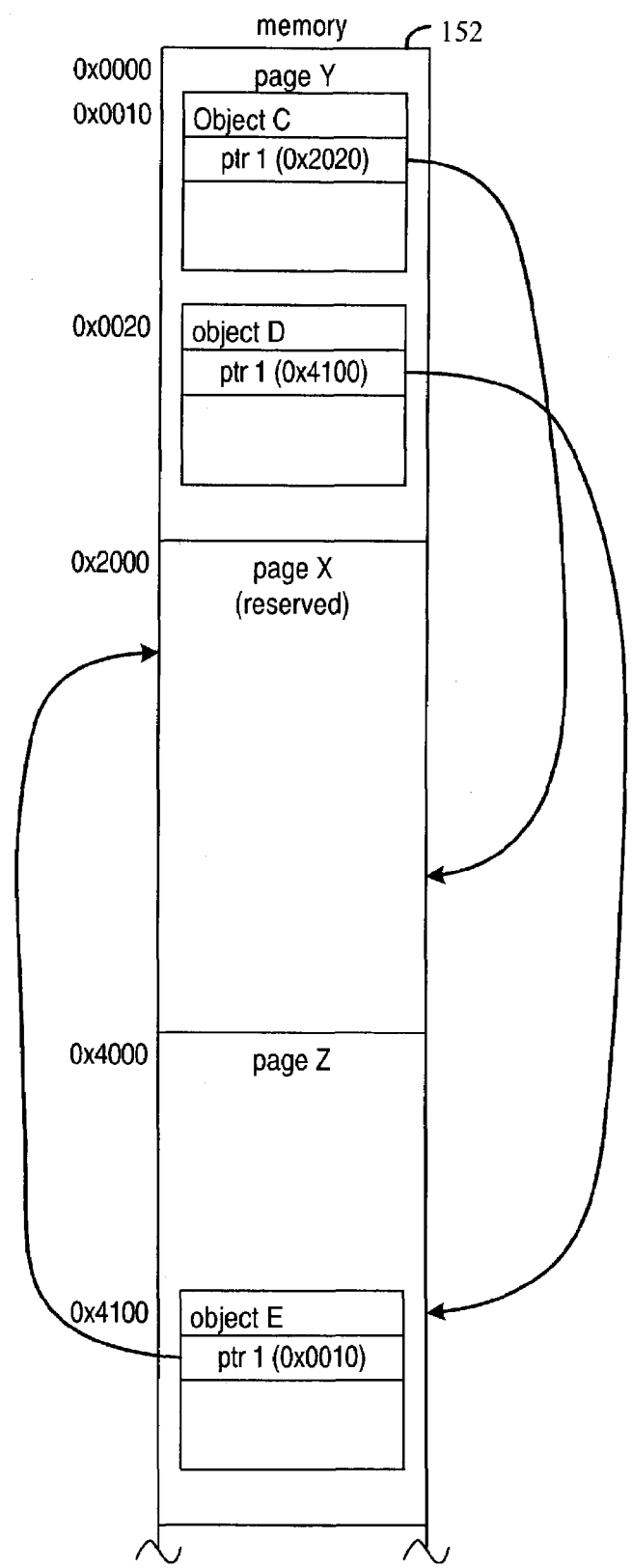
FIG. 3 illustrates the state of memory after a pointer to an object has been dereferenced.

FIGS. 1–3 illustrate example objects in persistent storage and paging of the objects to memory.

FIG. 1 illustrates an example portion of persistent storage address space 102. The portion includes example pages X (104), Y (106), and Z (108). The addresses on the left side of the address space are persistent addresses, which represent offsets relative to a base address in persistent storage, such as the base address of a file. The persistent addresses illustrate page boundaries and object addresses. Page X begins at 0×0000, page Y begins at 00×2000, and page Z at 0×18000.

Example objects A (112), B (114), C (116), D (118) and E (120) are illustrated. Objects A and B are stored in page X at 0×0010 and 0×0020, respectively; objects C and D are stored in page Y at 0×2020 and 0×2020, respectively, and object E is stored in page z at 0×18020.

Each object includes a pointer, designated ptr 1. A persistent pointer may hold a value that with some manipulation references another object in persistent storage. For example ptr 1 in object C holds the persistent pointer value 0×0008 that when multiplied by 4 is the persistent address (0×0020) of object B. The pointer translation is illustrated in block 122. Similarly, the value of ptr 1 in object D is used to reference object E (the translation being illustrated in block 124), and the value of ptr 1 in object E is used to reference object A.

The selected multiplier effectively increases the size of the address space that may be addressed by a persistent pointer value without requiring additional bytes for storing the persistent address. For example, with 4 as the value of the multiplier the range of persistent addresses is increased by a factor of 4. This increases the range of addressable persistent storage without requiring additional bytes for the pointers within the objects.

FIG. 2A illustrates an example portion of persistent storage 102, and FIG. 2B illustrates an example portion of memory 152 in which some of the objects from persistent storage have been paged-in to the memory. The paged-in objects include object C and object D.

The contents of page Y in persistent storage are paged-in when a pointer (not shown) to object D is dereferenced. Thus, both objects C and D are paged in with page Y. The order of and addresses of the memory pages in which objects from the persistent storage pages are paged-in may not correspond to the page order and page addresses in persistent storage. For example, objects C and D are stored in the page of memory that begins at 0×0000, whereas the persistent address of the page is 0×2000. It will be appreciated that the order in which memory pages are occupied by pages from persistent storage depends on the order in which an application references the objects. A map is constructed to record the relationship between memory addresses and persistent addresses of the pages.

The pointers in dereferenced objects are swizzled when the objects are paged-in to memory. For example, ptr 1 in object D has the persistent pointer value 0×6040 in persistent storage, which is swizzled to the memory pointer value 0×4100. The memory pointer value 0×4100 references a reserved page Z for object E. Instead of reading in the pages for object(s) referenced by a pointer(s) within a paged-in object when the paged-in object is initially read from persistent storage, a reserved page(s) is established for the object(s) not yet paged in and the appropriate pointer(s) is set to reference an address(es) in the reserved page(s). Pages are reserved in order to avoid paging-in every object in the file if the objects are linked by a chain of pointers. For example, page X is reserved at address 0×2000 for the object (object B) that is pointed to by ptr 1 of object C, and page Z is reserved at address 0×4000 for the page that includes the object (object E) referenced by ptr 1 of object D. As will be further explained below, a page fault signaled by the operating system is used to indicate that the contents of the page are to be paged-in to memory.

While not shown, it will be appreciated that a root pointer, which is always in the same location in persistent storage, may be used as the starting point for finding the objects in persistent storage. The root pointer may be used as the starting point from which other objects may be located and paged-in.

FIG. 3 illustrates the state of the memory 152 after ptr 1 of object D has been dereferenced. When the pointer is dereferenced, the map of persistent storage pages to memory pages is consulted to determine the persistent address of the page associated with memory page Z. Recall the relationship was established when page Y was paged-in and a page of memory was reserved for page Z.

To obtain the persistent address of page Z, part of the memory pointer value is masked, and the remainder (0×4000) is a memory pointer to page Z. From the mapping of memory pages to persistent storage pages, a persistent pointer to the page (e.g., 0×6000) is obtained. This value is then multiplied by a selected multiplier, for example 4, to arrive at the persistent address of page Z (0×6000*4=0×18000). In the example, the contents of page Z are read from persistent storage at address 0×18000 (FIG. 1) into memory at 0×4000.

FIG. 4 illustrates an example arrangement 200 in which the present invention may be used. The processes of FIGS. 5–10 are illustrated in the context of arrangement 200. The types of the objects are defined by and the manipulation of the data in the objects are performed by application 202.

The functions in page management are accessed either directly by the application or indirectly, for example through a database management library. The page management functions handle paging-in and paging-out of pages containing objects defined by the application. Page management 204 maintains page map 206, which contains associations of memory pointers and persistent pointers to pages reserved in memory.

The operating system 208 provides access to the hardware of persistent storage 210. The persistent storage may be local to the operating system or provided over a network. The operating system may handle the translation between logical persistent storage addresses and physical device addresses, depending on the type of persistent storage.

It will be appreciated that the operating system may perform it's own paging of various applications and data in managing computing resources. The paging performed by the operating system may be independent of the paging performed by page management 204 on behalf of application 202.

FIG. 5 illustrates a process for handling a page fault in accordance with example embodiments of the invention. The example processes of FIGS. 5–10 are explained as though the functions were implemented as part of page management 204 of FIG. 4. Those skilled in the art will recognize other functionally equivalent embodiments.

Upon encountering a page fault in dereferencing a pointer to an object, as indicated by the operating system (OS), the dereferenced memory pointer value is extracted from the OS-provided fault information (302). The memory pointer to the page is determined by masking a selected number of least significant bits in the memory pointer value (304). The number of bits that are masked depends on the system-specific or application-specific page size.

The page map 206 of FIG. 4 may be implemented to further include a collection of page records. Each page record contains information that describes a reserved page in memory. For example, the information includes a status code, a file name, a memory pointer to the page, a persistent pointer to the page, and a partition code (for a partitioned file). The page records may be organized and accessed in any implementation-suitable manner.

The page record for the memory pointer to the page is then obtained (306). If the status code indicates that the page is no-access (308), then the file name and persistent pointer to the page are obtained from the page record (310). The status of a page may be no-access, read-only, or read-write. The no-access status is used to indicate that a page has been reserved, and no data from the persistent storage page has been paged-in. The read-only status is used to indicate that a page is accessible to the application and has not been modified. This helps to minimize the amount of data written back to persistent storage. Pages that are read-only do not need to be written to persistent storage, while read-write pages must be written to persistent storage. The read-write access is used to allow full read and write access to the page.

The persistent pointer to the page from the page record is multiplied by a selected value to obtain the persistent address to be used in addressing and loading the target page. For example, in reference to FIG. 3 where ptr 1 in object D (value 0×4100) is dereferenced and page Z with object E is to be loaded, the pointer value 0×4100 must be resolved to obtain the proper persistent address of the page. The page-relative object offset portion of 0×4100 is masked to obtain the memory pointer to the page at address 0×4000. The page record for the page at 0×4000 contains the value 0×6000 to represent the persistent pointer to the page. This representation is multiplied by the selected multiplier (e.g., 4 (left shifted by 2 bits) to obtain the persistent address of the page (0×6000*4=0×18000) which is used in addressing the page in persistent storage.

As an aside, the target page may be part of a "convoy." The term "convoy" is used as an abstraction of the one or more pages needed to page-in an object. For smaller objects, a convoy may be a single page, and for larger objects (those requiring more than one page of storage), a convoy may include multiple pages. Whether a convoy is one page or many, a convoy in persistent storage includes a small header followed by the object(s) in the convoy. A map is maintained for use in locating the starting pages of any convoys. For example, if a convoy consists of pages 0×22000 and 0×24000, then both 0×22000 and 0×24000 are mapped to 0×22000. The persistent address of the first page of the convoy is determined using this map (312). It will be appreciated that the convoy map may be established when the page management initializes.

The status of the page is temporarily changed to read-write (314), so that the contents of the page can be loaded from persistent storage to memory (316). Once the contents of the page are loaded, each pointer(s) in the object(s) is swizzled. The processes of FIGS. 6 and 7 further illustrates loading the page(s) and swizzling pointers. The page is then marked read-only (318) to make it possible for the application to detect which pages have been modified and minimize the amount of information written back to persistent storage.

Where a page fault has occurred and the page is read-only (320), the page is marked dirty (322). This forces the contents of the in-memory page to be written to persistent storage at the appropriate time. For example, in a transaction processing paradigm, a page may be written to persistent storage when a transaction is committed. The page is then marked read-write (324) so that the page may be accessed by the application.

If the page status is read-write (326), then an error is signaled (328). In an example embodiment, error is communicated to the application, which may perform a core dump or handle the error in an application-appropriate manner.

FIG. 6 illustrates a process for loading the contents of a page(s) from persistent storage to memory. The process first obtains the protection level of the first page of the convoy (402). If the protection of the page is no-access (404), the protection of the page is changed to read-write and the contents of the first page of the convoy are loaded from persistent storage to memory (406). If the page is not the first page of the convoy (408), then the protection of the page need not be changed because the protection was changed in handling the fault (FIG. 5). The page is loaded from persistent storage to memory (410). The pointer(s) within each object on the loaded page are then swizzled (412). The process of FIG. 7 further describes swizzling of pointers.

FIG. 7 illustrates a process for swizzling each pointer on a page loaded from persistent storage into memory. In order to swizzle the pointers within the objects on a page, the process first obtains the type identifier for the object (502), and the type identifier is used to obtain the type descriptor of the object (504). The type descriptor indicates the pointers within the objects that reference other persistent objects.

For each object on the page (506), the process steps 508–520 are performed, and for each persistent pointer value in the object the process steps beginning at step 510 are performed.

A lookup operation is performed to obtain the page record for the persistent storage page referenced by the pointer value (510). If a page record does not yet exist for the referenced page (512), the process determines the first page of the convoy referenced by the pointer value (514). As described in FIG. 5, a convoy map is used for identifying the first pages of the convoys. Memory is then reserved and protected for the convoy (516). Recall that the convoy is loaded when the pointer is dereferenced. A new page record is created in which the memory page address of the newly reserved page is associated with the persistent pointer value (518).

The pointer value is then swizzled (520). The page-relative offset portion of the persistent storage pointer value is added to the memory page pointer, and the resulting memory pointer value is stored in the object.

FIG. 8 illustrates an example process for allocating memory for a new object. The example process assumes concurrent access to the file by multiple applications or by multiple threads. Thus, the process obtains a write lock on a selected partition of the file (602). In order to determine how much space is to be allocated, the process obtains the type descriptor that describes the type identifier of the object (604). One or more pages are then allocated according to the space requirements of the object (606). If space is available from previously de-allocated pages, then those pages are used instead of allocating additional pages.

The storage for each object begins on an address boundary that is a multiple of the selected multiplier that is used to derive the persistent address of an object from a pointer value. For example, if the multiplier is 4, each object begins on a 4-byte boundary in order to protect against a pointer value referencing a byte in the middle of an object.

Each newly allocated page is marked dirty so that data written to the page in memory is stored to persistent storage. The persistent address assigned to the page is at the end of the file. The object is then initialized according to application requirements (608).

While not shown, it will be appreciated that in an example embodiment the lock is released when the transaction that caused the allocation is committed.

De-allocating memory space for an object involves locking the appropriate partition of the file and de-allocating the memory occupied by the object.

FIG. 9 illustrates an example process for unswizzling the pointers in each object on a page. The process first obtains the type identifier for the object (702), and the type identifier is used to obtain the type descriptor of the object (704). The type descriptor indicates the pointers within the objects that reference other persistent objects.

For each object on the page (706), the process steps 708–716 are performed, and for each memory pointer value in the object the process steps beginning at step 710 are performed.

The memory page pointer is obtained from the memory pointer value (710). The pointer value specifies a memory pointer to the page and a page-relative object offset. Thus, the memory pointer to the page may be obtained by masking the number of least-significant bits of the pointer value that are used to represent the page-relative object offset. For example, in FIG. 3 if page Y is to be unswizzled, ptr 1 in object D, having a value 0×4100, will be unswizzled. If the page-relative object offset is represented by the 13 least-significant bits, which are masked, the resulting memory pointer to the page is 0×4000.

The page record for the memory page pointer is obtained, and from the page record the corresponding persistent pointer to the page is read (712). For example, in the example of FIG. 3, the page record for page Z stores the memory page pointer 0×4000 and the corresponding persistent page pointer 0×6000.

The persistent page pointer and page-relative object offset are then used to compute the persistent storage pointer value (714). The computation is illustrated by continuing the example of FIG. 3. The page-relative object offset from the pointer value 0×4100 is 0×100. This page-relative object offset value is right shifted to account for the multiplication (left shift) that is performed when the pointer value is swizzled. Thus, 0×100 becomes 0×040. This new offset is added to the persistent page pointer obtained from the page record to obtain the persistent storage pointer value (0×6000+0×040=0×6040). The pointer value in the object is then replaced with the persistent storage pointer value (716).

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems that support virtual addressing and has been found to be particularly applicable and beneficial in paging systems involving swizzling and unswizzling of pointers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:
    swizzling each persistent storage pointer value in an object to a memory pointer value when the object is transferred from persistent storage to memory;
    unswizzling each memory pointer value in an object to a persistent storage pointer value when the object is transferred from memory to persistent storage;
    generating a persistent storage address from a persistent storage pointer value as a product of a selected multiplier, n, and the persistent storage pointer value; and
    when an object is transferred from persistent storage to memory, reserving memory space for each additional object not present in memory and referenced by a persistent pointer value contained in the transferred object.

2. The method of claim 1, further comprising storing each memory pointer value in an in-memory object in a number of bytes that is equal in size to a number of bytes of the corresponding persistent-storage pointer value.

3. The method of claim 2, further comprising aligning each object in persistent storage on an n-byte boundary.

4. The method of claim 1, further comprising:
    managing the persistent storage and memory in units of pages;
    when a memory pointer value is dereferenced and the corresponding object is not present in memory, copying one or more pages containing the object from persistent storage to memory;
    wherein reserving memory space includes updating a page map of persistent page addresses and corresponding memory pages addresses; and
    wherein swizzling a persistent pointer value includes obtaining a persistent page address from the persistent pointer value, obtaining from the page map a memory page address corresponding to the persistent page address, obtaining a page-relative offset from the persistent pointer value, adding the page-relative offset to the memory page address whereby a memory pointer value is formed, and storing the memory pointer value in an object in memory.

5. The method of claim 4, wherein unswizzling a memory pointer value includes obtaining a memory address from the memory pointer value, obtaining from the page map a persistent address corresponding to the memory address, obtaining a page-relative offset from the memory pointer value, adding the page-relative offset to the persistent address whereby a persistent pointer value is formed, and storing the persistent pointer value in an object in persistent storage.

6. A computer-implemented method for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

managing the persistent storage and memory in units of pages;

maintaining a page map of persistent page addresses and corresponding memory page addresses;

receiving from an operating system a signal when a dereferenced object referenced by a memory pointer value is in persistent storage and not in memory;

obtaining from the operating system the memory pointer value;

masking a page-offset portion of the memory pointer value resulting in a memory page address;

obtaining from the page map a target persistent page address corresponding to the memory page address;

generating an effective persistent page address as a product of the target persistent page address and a selected multiplier, n;

loading a page of data from persistent storage at the effective persistent page address to memory at the memory page address;

determining from a type descriptor associated with each type of object, each location of each pointer value in each object in the page at the memory address; and swizzling each persistent pointer value in each object of the page at the memory page address, and when each persistent pointer value in an object is swizzled, reserving one or more pages of memory for an object not present in memory and referenced by the persistent pointer value, and updating the page map with a persistent page address derived from the persistent pointer value and at least one memory page address of the one or more memory pages.

7. The method of claim 6, wherein swizzling a persistent pointer value includes obtaining a persistent page address from the persistent pointer value, obtaining from the page map a memory page address corresponding to the persistent page address, obtaining a page-relative offset from the persistent pointer value, adding the page-relative offset to the memory page address whereby a memory pointer value is formed, and storing the memory pointer value in an object in memory.

8. The method of claim 7, further comprising unswizzling each memory pointer value in an object to a persistent pointer value when the object is transferred from memory to persistent storage, wherein unswizzling a memory pointer value includes obtaining a memory page address from the memory pointer value, obtaining from the page map a persistent page address corresponding to the memory page address, obtaining a page-relative offset from the memory pointer value, adding the page-relative offset to the persistent page address whereby a persistent pointer value is formed, and storing the persistent pointer value in an object in persistent storage.

9. The method of claim 8, further comprising storing each memory pointer value in an in-memory object in a number of bytes that is equal in size to a number of bytes of in which a corresponding persistent pointer value is stored in persistent storage.

10. The method of claim 9, further comprising aligning each object in persistent storage on an n-byte boundary.

11. An apparatus for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

means for swizzling each persistent storage pointer value in an object to a memory pointer value when the object is transferred from persistent storage to memory;

means for unswizzling each memory pointer value in an object to a persistent storage pointer value when the object is transferred from memory to persistent storage;

means for generating a persistent storage address from a persistent storage pointer value as a product of a selected multiplier, n, and the persistent storage pointer value; and means, responsive to transfer of an object from persistent storage to memory, for reserving memory space for each additional object not present in memory and referenced by a persistent pointer value contained in the transferred object.

12. An apparatus for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

means for managing the persistent storage and memory in units of pages;

means for maintaining a page map of persistent page addresses and corresponding memory page addresses;

means for receiving from an operating system an signal when a dereferenced object referenced by a memory pointer value is in persistent storage and not in memory;

means for obtaining from the operating system the memory pointer value;

means for masking a page-offset portion of the memory pointer value resulting in a memory page address;

means for obtaining from the page map a target persistent page address corresponding to the memory page address;

means for generating an effective persistent page address as a product of the target persistent page address and a selected multiplier, n;

means for loading a page of data from persistent storage at the effective persistent page address to memory at the memory page address;

means for determining from a type descriptor associated with each type of object, each location of each pointer value in each object in the page at the memory address;

means for swizzling each persistent pointer value in each object of the page at the memory page address; and means, responsive to swizzling each persistent pointer value in an object, for reserving one or more pages of memory for an object not present in memory and referenced by the persistent pointer value, and for updating the page map with a persistent page address derived from the persistent pointer value and at least one memory page address of the one or more memory pages.

13. An article of manufacture for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

a computer-readable medium configured with instructions for causing a computer to perform the steps of:

swizzling each persistent storage pointer value in an object to a memory pointer value when the object is transferred from persistent storage to memory;

unswizzling each memory pointer value in an object to a persistent storage pointer value when the object is transferred from memory to persistent storage;

generating a persistent storage address from a persistent storage pointer value as a product of a selected multiplier, n, and the persistent storage pointer value; and when an object is transferred from persistent storage to memory, reserving memory space for each additional object not present in memory and referenced by a persistent pointer value contained in the transferred object.

14. The article of manufacture of claim 13, wherein the computer-readable medium is further configured with instructions for causing a computer to perform the step of storing each memory pointer value in an in-memory object in a number of bytes that is equal in size to a number of bytes in which a corresponding persistent pointer value is stored in persistent storage.

15. The article of manufacture of claim 14, wherein the computer-readable medium is further configured with instructions for causing a computer to perform the step of aligning each object in persistent storage on an n-byte boundary.

16. The article of manufacture of claim 13, wherein the computer-readable medium is further configured with instructions for causing a computer to perform the steps of:

managing the persistent storage and memory in units of pages;

when a memory pointer value is dereferenced and the corresponding object is not present in memory, copying one or more pages containing the object from persistent storage to memory;

wherein reserving memory space includes updating a page map of persistent page addresses and corresponding memory pages addresses; and wherein swizzling a persistent pointer value includes obtaining a persistent page address from the persistent pointer value, obtaining from the page map a memory page address corresponding to the persistent page address, obtaining a page-relative offset from the persistent pointer value, adding the page-relative offset to the memory page address whereby a memory pointer value is formed, and storing the memory pointer value in an object in memory.

17. The article of manufacture of claim 16, wherein unswizzling a memory pointer value includes obtaining a memory address from the memory pointer value, obtaining from the page map a persistent address corresponding to the memory address, obtaining a page-relative offset from the memory pointer value, adding the page-relative offset to the persistent address whereby a persistent pointer value is formed, and storing the persistent pointer value in an object in persistent storage.

18. An article of manufacture for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

a computer-readable medium configured with instructions for causing a computer to perform the steps of:

managing the persistent storage and memory in units of pages;

maintaining a page map of persistent page addresses and corresponding memory page addresses;

receiving from an operating system an signal when a dereferenced object referenced by a memory pointer value is in persistent storage and not in memory;

obtaining from the operating system the memory pointer value;

masking a page-offset portion of the memory pointer value resulting in a memory page address;

obtaining from the page map a target persistent page address corresponding to the memory page address;

generating an effective persistent page address as a product of the target persistent page address and a selected multiplier, n;

loading a page of data from persistent storage at the effective persistent page address to memory at the memory page address;

determining from a type descriptor associated with each type of object, each location of each pointer value in each object in the page at the memory address;

swizzling each persistent pointer value in each object of the page at the memory page address; and when each persistent pointer value in an object is swizzled, reserving one or more pages of memory for an object not present in memory and referenced by the persistent pointer value, and updating the page map with a persistent page address derived from the persistent pointer value and at least one memory page address of the one or more memory pages.

19. The article of manufacture of claim 18, wherein swizzling a persistent pointer value includes obtaining a persistent page address from the persistent pointer value, obtaining from the page map a memory page address corresponding to the persistent page address, obtaining a page-relative offset from the persistent pointer value, adding the page-relative offset to the memory page address whereby a memory pointer value is formed, and storing the memory pointer value in an object in memory.

20. The article of manufacture of claim 19, wherein the computer-readable medium is further configured with instructions for causing a computer to perform the step of unswizzling each memory pointer value in an object to a persistent pointer value when the object is transferred from memory to persistent storage, wherein unswizzling a memory pointer value includes obtaining a memory page address from the memory pointer value, obtaining from the page map a persistent page address corresponding to the memory page address, obtaining a page-relative offset from the memory pointer value, adding the page-relative offset to the persistent page address whereby a persistent pointer value is formed, and storing the persistent pointer value in an object in persistent storage.

21. The article of manufacture of claim 20, wherein the computer-readable medium is further configured with instructions for causing a computer to perform the step of storing each memory pointer value in an in-memory object in a number of bytes that is equal in size to a number of bytes in which a corresponding persistent pointer value is stored in persistent storage.

22. The article of manufacture of claim 21, wherein the computer-readable medium is further configured with instructions for causing a computer to perform the step of aligning each object in persistent storage on an n-byte boundary.

23. A computer-implemented method for managing persistent data objects between persistent storage and memory, wherein a plurality of the objects include one or more pointer values that reference other ones of the objects, and each pointer value in an object being a persistent storage pointer value when the object is in persistent storage and each pointer value in the object being a memory pointer value when the object is in memory, comprising:

swizzling each persistent storage pointer value in an object to a memory pointer value when the object is transferred from persistent storage to memory;

generating a persistent storage address from a persistent storage pointer value as a product of a selected multiplier, n, and the persistent storage pointer value; and when an object is transferred from persistent storage to memory, reserving memory space for each additional object not present in memory and referenced by a persistent pointer value contained in the transferred object.

24. The computer-implemented method of claim 23 wherein the memory comprises a volatile memory element.

* * * * *